(12) United States Patent
Kaluskar (10) Patent No.: US 7,835,405 B2
(45) Date of Patent: Nov. 16, 2010

(54) MULTIPLEXING/DEMULTIPLEXING ON A SHARED INTERFACE

(75) Inventor: Pramod Kaluskar, Edison, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 259 days.

(21) Appl. No.: 11/940,268

(22) Filed: Nov. 14, 2007

(65) Prior Publication Data

US 2008/0130494 A1 Jun. 5, 2008

Related U.S. Application Data

(60) Provisional application No. 60/872,059, filed on Dec. 1, 2006.

(51) Int. Cl.
*H04J 3/06* (2006.01)
(52) U.S. Cl. ...................................... 370/512
(58) Field of Classification Search ................ 370/512, 370/535, 392, 469, 389, 401, 468, 492, 229, 370/230.1, 235, 253, 341, 358, 350, 391, 370/402, 403, 404, 324, 328, 432, 514, 908, 370/471, 474, 395.2, 395.53, 395.41; 709/223–237
See application file for complete search history.

(56) References Cited

U.S. PATENT DOCUMENTS

| 6,118,797 | A | 9/2000 | O'Shea |
| 6,459,682 | B1 | 10/2002 | Ellesson et al. |
| 6,850,542 | B2 | 2/2005 | Tzeng |
| 6,898,641 | B1 * | 5/2005 | Kobayashi .................. 709/238 |
| 6,910,149 | B2 | 6/2005 | Perloff et al. |
| 6,980,520 | B1 * | 12/2005 | Erimli ........................ 370/236 |
| 6,993,026 | B1 * | 1/2006 | Baum et al. ................. 370/392 |
| 7,463,579 | B2 * | 12/2008 | Lapuh et al. ................ 370/216 |
| 7,529,250 | B2 * | 5/2009 | Pedersen ............... 370/395.21 |
| 7,567,571 | B2 * | 7/2009 | Wybenga et al. ....... 370/395.32 |
| 2002/0006137 | A1 | 1/2002 | Rabenko et al. |

OTHER PUBLICATIONS

PCT International Search Report and Opinion dated Apr. 24, 2008.

* cited by examiner

*Primary Examiner*—Chi H Pham
*Assistant Examiner*—Alexander Boakye
(74) *Attorney, Agent, or Firm*—Thomas, Kayden, Horstemeyer & Risley, LLP (57) ABSTRACT

An embodiment of an interface system including, among others, an aggregation device comprising a plurality of ports, a first device comprising a plurality of ports, and one or more links that link the entire plurality of ports of the aggregation device and first device, the one or more links fewer in quantity than the entire plurality of ports.

17 Claims, 6 Drawing Sheets

MULTIPLEXING/DEMULTIPLEXING ON A SHARED INTERFACE

CROSS-REFERENCE TO RELATED APPLICATION

This application claims priority to copending U.S. provisional application entitled, "Multiplexing, De-multiplexing and Performing Per-Flow Flow-control on Ethernet," having Ser. No. 60/872,059, filed Dec. 1, 2006, which is entirely incorporated herein by reference.

TECHNICAL FIELD

The present disclosure is generally related to data interfaces, and more particularly, and, more particularly, is related to the control and allocation of data flow among devices.

BACKGROUND

A digital subscriber line (DSL) network enables a user, through customer premise equipment (CPE) (e.g., modem, computer, set-top terminal, personal digital assistant, or other communication devices), to transmit data to, or receive data from, an upstream source via multiple data channels. DSL networks support a variety of different data, such as video, voice, voice over IP (VoIP), among other data. The customer premise equipment is typically located at a business or residence, and users at a terminal or endpoint, such as a computer or other electronic appliance, access the network through modems or a gateway.

Figure 1:
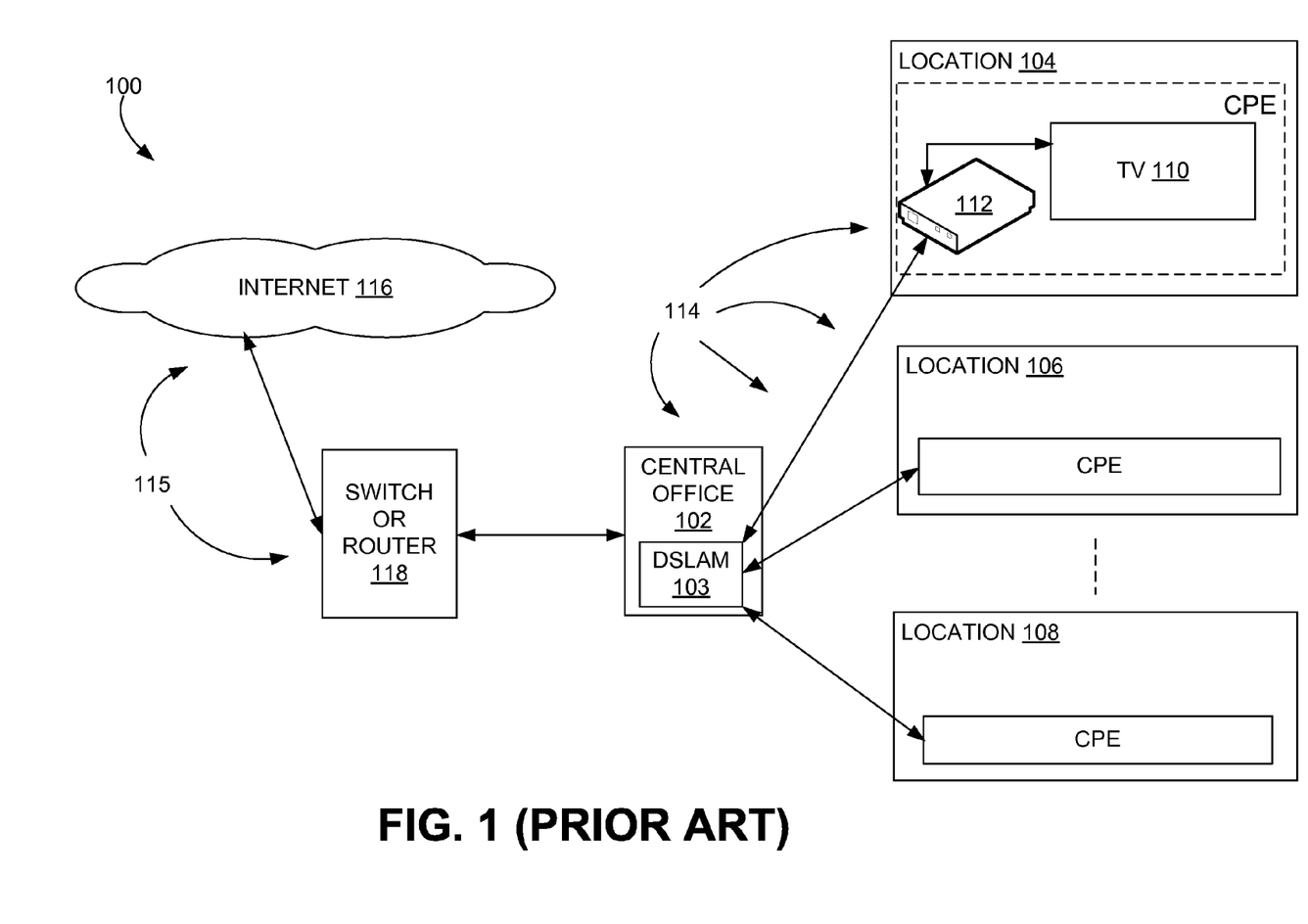
FIG. 1 is a block diagram of an exemplary digital subscriber line (DSL) network.

FIG. 1 is a block diagram of an exemplary DSL network 100. The DSL network 100 includes a central office 102 that comprises a digital subscriber line access multiplexer (DSLAM) 103 that terminates a plurality of DSL lines from customer premise equipment at multiple locations 104, 106, and 108. Such locations 104, 106, and 108 may represent businesses or residences. Referring to location 104 as one exemplary arrangement, the CPE includes a television 110 coupled to a DSL modem 112, which is in bidirectional communication with the DSLAM 103 of the central office 102. The DSLAM 103 and the CPEs collectively comprise an access network 114. The central office 102 accesses a core network 115 comprising the Internet 116 and an ATM switch or router 118.

As is known, data interfaces, including Ethernet interfaces such as media independent interfaces (MII) or serial media independent interfaces (SMII), among others, are used in DSLAMs 103 to connect Ethernet physical layer transceivers or devices (such as a multi-port line card comprising a plurality of modems) to aggregation devices (e.g., such as a multi-port network processor or Ethernet switches). However, such Ethernet interfaces are not without shortcomings. For instance, line cards often have a plurality of ports (e.g., 24, 48, 72, 96) that have a corresponding SMII interface. One SMII interface per port translates to a larger number of SMII interfaces per line card, resulting in increased design complexity on the associated circuit board and an increased bill of material (BOM) for manufacturing purposes.

Further, such Ethernet interfaces have constraints with regards to bandwidth. For example, in a 100 Mbps interface, it is not possible to demonstrate a 100 Mbps throughput with 64-byte-sized packets since maximum SMII utilization at 64-byte packets is approximately 70% due to overhead (e.g., collectively, 12-byte interfame gap (IFG) and 8-byte preamble resulting in 20-byte or ~30% overhead per 60-byte packet-payload). Additionally, each SMII link is limited to 100/100 Mbps traffic, whereas more advanced standards of DSL communications (e.g., very high speed digital subscriber line 2, or VDSL2) may have rates that increase beyond 100/100 Mbps. Also, there is a one-to-one connection or mapping between an SMII link and an xDSL line, preventing bandwidth sharing across SMII links.

SUMMARY

Disclosed herein are certain embodiments of interface systems and methods. Briefly described, one embodiment of the system, among others, comprises an aggregation device comprising a plurality of ports, a first device comprising a plurality of ports, and one or more links that link the entire plurality of ports of the aggregation device and first device, the one or more links fewer in quantity than the entire plurality of ports.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed embodiments. Moreover, in the drawings, like reference numerals designate corresponding parts throughout the several views.

DETAILED DESCRIPTION

Described herein are various embodiments of interface systems and methods, collectively referred to herein as interface systems. Such interface systems approach shortcomings of conventional systems, for instance as described in the background of the present disclosure, in several ways.

For instance, with regard to the bandwidth constraints and excessive interfaces, one embodiment of interface systems is configured with a single gigabit media independent interface (GMII) link (or serial gigabit media independent interface (SGMII) link or reduced gigabit media independent interface (RGMII) link in some embodiments) instead of a plurality of links (e.g., serial media independent interface (SMII)), where in conventional systems, each of the plurality of links is connected to the respective xDSL (digital subscriber line) port. In other words, in certain embodiments of interface systems described herein, an aggregation device comprising a plurality of ports communicates with a device (e.g., a PHY device, though not limited to PHY devices) having a plurality of ports using a single link in between. With such a replacement or substitution, a reduction in the amount of links can be realized according to the following exemplary, non-limiting:
  a. 1×GMII interface for an 8-port PHY
    i. 48-port system=6×SGMII interfaces
    ii. 96-port system=12×SGMII interfaces
  b. 1×GMII interface for an 16-port PHY
    i. 48-port system=3×SGMII interfaces
    ii. 96-port system=6×SGMII interfaces
  c. 1×GMII interface for a 24-port PHY
    i. 48-port system=2×SGMII interfaces
    ii. 96-port system=4×SGMII interfaces For example, for an 8-port PHY, a single GMII link can be used, and for a 48-port PHY, six (6) SGMII links can be used. From the above exemplary arrangements, it is evident that 8×125/125 Mbps interfaces equal 1000/1000 Mbps, which can be supported by a single GMII link. That is, eight (8)× VDSL2 (very high speed digital subscriber line 2) interfaces can run at full rate. Should VDSL2 (or other standards) later be defined to support more than 100/100 Mbps data rates, the above configurations can still support such increased traffic flows since not all links will carry more than 100/100 Mbps of traffic at the same time.

Having provided a general overview of various embodiments of an interface system, a more detailed description follows in the context of a digital subscriber line (DSL) network, with the understanding that the scope of the embodiments described herein are not so limited, and that other communication systems are similarly contemplated as environments that can benefit from the interface systems described herein.

Further, although described in the context of using Ethernet interfaces using, for example, media independent interfaces such as GMII-type links, it should be appreciated in the context of this disclosure that such examples are for purposes of illustration, and that other types of interfaces (e.g., non-Ethernet) are contemplated to be within the scope of the present disclosure. For instance, some embodiments of interface systems can be configured with a SerDes link (e.g., 2.5 Gbps, 5 Gbps, etc.). Indeed, the multiplexing/demultiplexing mechanisms (and flow control mechanisms) described as part of the various embodiments of interface systems can be used on any interface that uses a single shared channel to serve multiple destinations (e.g., channels).

Additionally, the various embodiments described herein can be used to extend the capabilities of shared media. For example, the mechanisms described herein can be used on a Utopia Level2/POS PHY2 interface, such as to communicate finer granularity ("channel") information and use a port number to define a coarser granularity port. In addition, as explained above, though described in the context of a "PHY device" other devices that receive data over the shared medium are considered to be within the scope of the disclosure.

Figure 2:
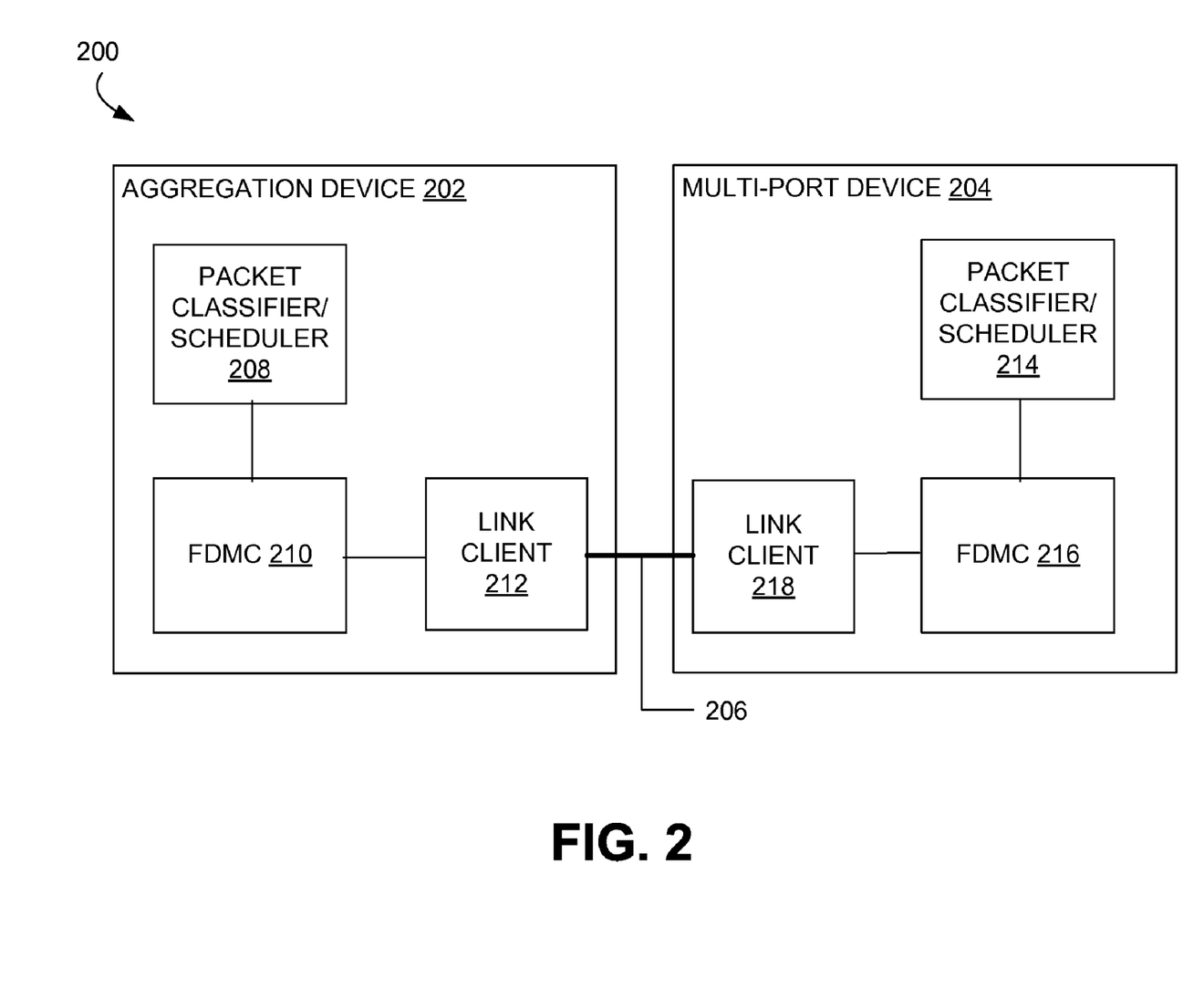
FIG. 2 is a block diagram of an embodiment of an interface system.

FIG. 2 is a block diagram of one embodiment of an interface system 200 comprising a multi-port aggregation device 202, a multi-port device 204 (e.g., PHY device), and a link 206 (e.g., media independent interface (MII) link, serial media independent interface (SMII) link, gigabit media independent interface (GMII)-type link 206, where GMII-type includes GMII, RGMII, SGMII, SerDes link, etc.). The link 206 from the aggregation device 202 carries one or more logical sublinks, as explained below. Aggregation device 202 comprises a packet classifier and scheduler 208, packet multiplexer/demultiplexer and flow control (FDMC) module 210 (also referred to as a multiplexing module), and a link client 212 (e.g., for Ethernet interfaces, a GMII client, among others). Multi-port device 204 similarly comprises a packet classifier and scheduler 214, packet multiplexer/demultiplexer and flow control (FDMC) module 216 (also referred to as a multiplexing module), and link client 218.

For purposes of the discussion throughout, "downstream" is referenced from aggregation device 202 to multi-port device 204 (e.g., in a direction toward the local loop), and "upstream" is referenced from multi-port device 204 to aggregation device 202 (e.g., in a direction away from the local loop). In downstream operation, the packet classifier and scheduler 208 classifies one or more packets to enable association by the FDMC module 210 with an appropriate channel. That is, the FDMC module 210 performs a multiplexing operation (to be described below) and passes the packets to the link client 212, from which the packets are sent over the link 206. The packets are received at the link client 218, passed to the FDMC module 216 to be demultiplexed, and then queued to an appropriate queue (not shown).

In the upstream direction, packets received from a processing device, such as the packet classifier and scheduler 214 are queued in one or more input queues, and received (e.g., retrieved) by the FDMC module 216. The FDMC module 216 determines and adds an appropriate packet encapsulation for delivery over the link 206. In one embodiment, such a determination is based on the header configured on the input queues. The queued packets are then sent over the link 206 via the link client 218 to the aggregation device 202.

In one embodiment, the interface system 200, and in particular, the FDMC module 210, employs an addressing mechanism or method to enable multiplexing/demultiplexing of packets on the link 206. As set forth above, the link 206 comprises one or more logical sublinks. The sublinks can be based on different types of information or parameters. The sublinks can be used to identify an entity. For instance, a 100/100 Mbps link can be used to supply data to twenty customers, each of which would be allocated 5/5 Mbps. The multiplexing/demultiplexing and flow control mechanisms described herein enable one customer to use the full 100/100 Mbps traffic when other customers are not using it. In one embodiment, each port+latency+priority combination constitutes a separate "channel" over which data can be passed. The term "channel" includes this three-tuple port+latency within the port+priority within the port+latency combination. A channel is uniquely addressable from the aggregation device 202 to the multi-port device 204.

In one embodiment, each port requires eight (8) channels, with four (4) latencies per port, and two (2) priorities per latency. Accordingly, for an 8-port device, there exists eight (8) xDSL ports, for a total of 8 channels×8 ports or 64 flows. Similarly, for a 16-port device (or 24-port device), there exists sixteen (16) xDSL ports (or twenty-four (24) xDSL ports) for a total of 8 channels×16 ports (or 8×24) or 128 flows (or 192 flows). It is noted that some implementations (e.g., using 16-port VDSL2 devices) use two SGMII interface links given bandwidth requirements and given that the ports are partitioned between the physical links (e.g., physical SGMII links). Further, although described in the context of four latencies and two priorities, it should be understood in the context of this disclosure that other quantities of latencies and/or priorities are contemplated within the scope of the present disclosure.

The tables below provide exemplary field widths used in one embodiment to communicate the various parameters or parameter values:

TABLE 1

Port# Field: 5-bits wide

| Value | Meaning |
| --- | --- |
| 0x00 to 0x17 (both inclusive) | Actual Port # indicating which xDSL port the packet should go to. |
| 0x18 to 0x1F (both inclusive) | Special addresses reserved for future use |

TABLE 2

Latency# Field: 2-bits wide

| Value | Meaning |
| --- | --- |
| 0x0 | Latency#0 |
| 0x1 | Latency#1 |
| 0x2 | Latency#2 |
| 0x3 | Latency#3 |

TABLE 3

Priority# Field: 1-bit wide

| Value | Meaning |
| --- | --- |
| 0x0 | Lower priority |
| 0x1 | Higher priority |

The data in each channel passes at its configured/negotiated output rate, which is achieved in two ways: (1) have the aggregation device 202 schedule traffic on each channel to ensure service level agreements (SLAs) are met; and (2) have the multi-port device 204 flow-control each channel (described below) to meet allowed bandwidth. In some embodiments, the flow control mechanisms are used to achieve line rates on a per port-per-latency basis, limiting functionality (of the aggregation device 204 involving negotiation of output rates) to ensuring that a packet with the correct priority is sent out on the channel.

Figure 3:
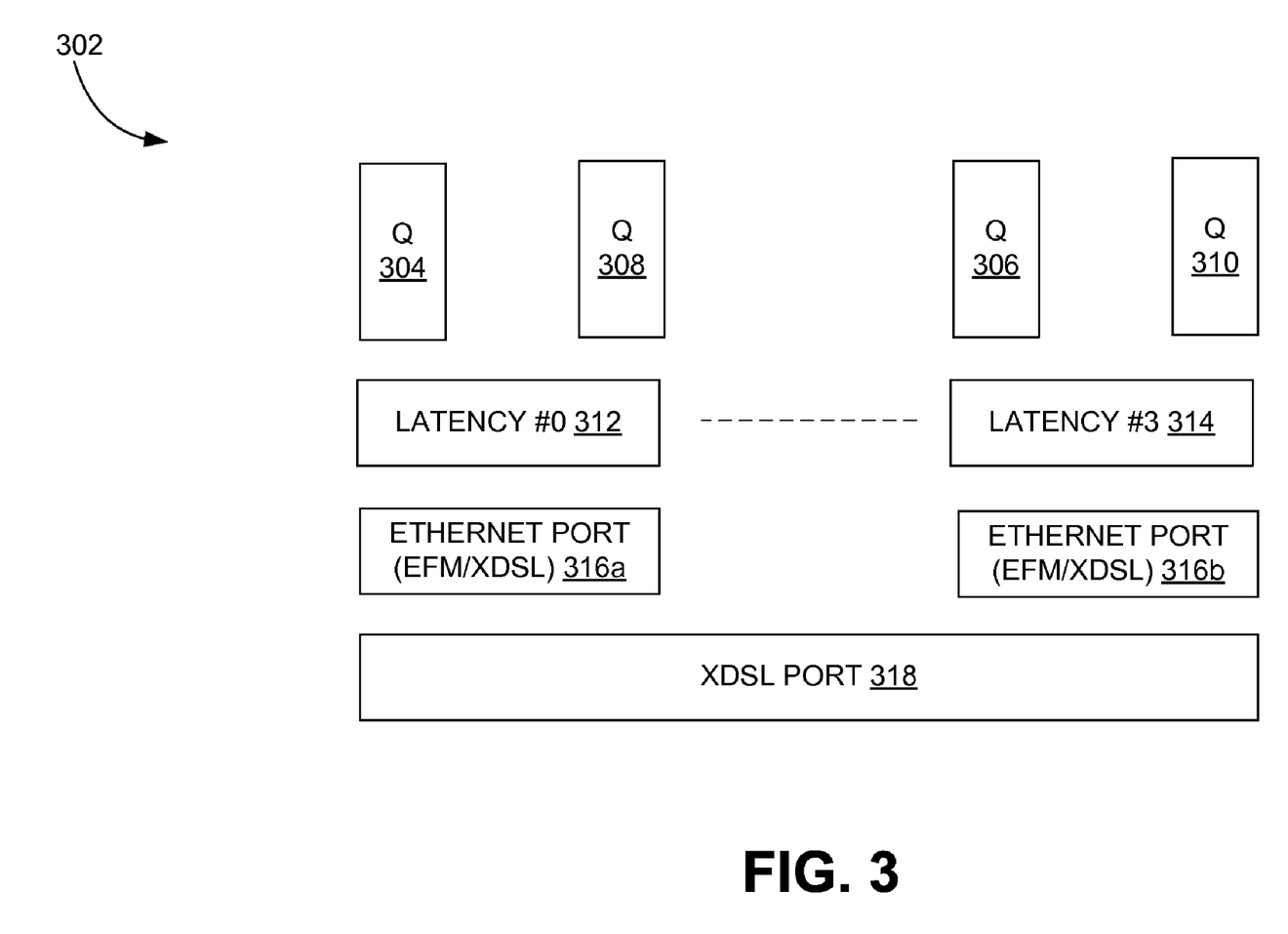
FIG. 3 is a block diagram that illustrates one exemplary hierarchy at the aggregation device of the interface system shown in FIG. 2.

FIG. 3 is a block diagram that illustrates one exemplary hierarchy (or stack) 302 at the aggregation device 202 for an Ethernet application. As shown, the hierarchy 302 comprises low priority queues 304, 306 and high priority queues 308, 310 associated with or "on top of" respective latency blocks 312 through 314, the latency blocks 312 through 314 on top of respective Ethernet ports (EFM/xDSL) 316a and 316b, which in turn are on top of an xDSL port 318. Table 4 below illustrates the number of bits required for the addressing mechanism described above:

| Parameter | Maximum Value | Typical Value |
| --- | --- | --- |
| Number of Addressable Ports (Port #) | 24 (5-bits) | 8 (3-bits) |
| Number of Latencies (Latency #) | 2 (1-bit) | 2 (1-bit) |
| Number of Priorities (Priority #) | 2 (1-bit) | 2 (1-bit) |
| Total | 7-bits | 5-bits |

Having described an embodiment of an addressing scheme of the interface system 200, attention is directed to flow-control information exchange mechanisms or methods employed in certain embodiments of the interface system 200, and in particular, employed by FDMC modules 210 and 216. Such flow control mechanisms enable communication of flow control information per channel in an asynchronous manner in both upstream and downstream directions. Two components of such flow control mechanisms include information (e.g., the specific information that needs to be exchanged (including the format of the exchanged information)) and the channel (e.g., over which the information is exchanged, such as the in-band or out-of-band channel). In one embodiment, the flow-control information is communicated and utilized entirely in hardware. For instance, a software-configurable, weighted round-robin (WRR) (or the like) scheduling engine can be implemented to schedule traffic across all channels in hardware. In some embodiments, the flow-control information is interrogated by the packet classifier and scheduler 208. The packet classifier and scheduler 208 queues packets to the relevant channel-queues in the aggregation device 202. Depending on the bandwidth available on the link 206 and the flow-control information available on the relevant channel, packets can be scheduled entirely in hardware. The description below first addresses the information component (e.g., through description of autonomous and polled mechanisms), followed by a description of the channel component (e.g., in-band, out-of-band).

At least two different mechanisms may be employed in the interface system 200 to communicate flow-control information, namely autonomous and polled. In an autonomous approach, when there is congestion on a channel (e.g., three-tuple), the FDMC module 216 of the multi-port device 204 communicates this condition to the aggregation device 202. Such a communication may involve an autonomous/asynchronous mechanism triggered, for example, by a buffer-availability condition in the system 200 (e.g., in essentially any part of the system, such as in the link clients 212, 218, or elsewhere), though typically at the egress of the system 200 (e.g., egress in the downstream direction comprises the aggregation device 202, and egress for the multi-port device 204 in the upstream direction comprises the link client 218 and in the downstream direction, an xDSL port (not shown).

In some embodiments, a polled mechanism is employed. Flow-control information may be sent by the multi-port device 204 in response to a query from the upstream device (e.g., the aggregation device 202). Such a query can be issued, for example, in response to a management query, or triggered by an overload-control entity (e.g., in the aggregation device 202) to obtain consolidated information.

In some embodiments, a combination of a polled and autonomous mechanism may be employed at the same time on the same interface (link 206). In one embodiments, the use of polled or autonomous can be distinguished by the OpCode (described below).

Continuing the description on autonomous congestion status reporting mentioned above, such reporting is prompted in response to the commencement or absence of congestion on a given channel (e.g., when the relevant congestion/queue thresholds are reached on the multi-port device 204). Congestion status reporting may be reported for each packet or on a periodic basis. In one per-packet embodiment, a status message (e.g., status=congested) is sent by the multi-port device 204 when congestion commences, and can be repeated for redundancy in some embodiments. Thereafter, the status message can be sent once for each packet that is received by the multi-port device 204 from the aggregation device 202 as long as the multi-port device 204 is congested. When congestion in the multi-port device 204 is no longer present, a status message (e.g., status=not congested) is sent once (or in some embodiments, repeated for redundancy) indicating the change in status.

In embodiments of the interface system 200 employing periodic status reporting, a status message (e.g., status=congested) is sent once by the multi-port device 204 when congestion commences (and repeated in some embodiments for redundancy). Thereafter, the status message indicating congestion can be sent at fixed intervals (e.g., intervals based on time, based on number of packets received from the aggregation device 202, etc.) as long as the congestion at the multi-port device 204 continues. When the congestion at the multi-port device 204 is no longer present, a status message is sent (e.g., status=not congested) once (or repeated in some embodiments) to indicate the change in status.

One exemplary format for a status message is described below in TABLE 5 on the basis of a 2-byte message:

| Bit(s) | Meaning |
| --- | --- |
| 15-8 | Port# |
| 7-5 | Not used |
| 4 | All Priorities and All Latencies |
| 3-2 | Latencies |
|  | 00 = Latency 0 |
|  | 01 = Latency 1 |
|  | 10 = Latency 2 |
|  | 11 = Latency 3 |
| 1 | Priority |
|  | 0 = Low Priority Path |
|  | 1 = High Priority Path |
| 0 | Status |
|  | 0 = Not congested |
|  | 1 = Congested |

With regard to the polled or query-response status reporting mentioned above, in one embodiment, two message formats are defined: query and response. Such message formats can be identified by a message OpCode, with the status query having a format such as OpCode (no data)=0xA5A5 (0xA5A5 shown as a non-limiting example, and hence other numbers may be used). In one embodiment, the OpCode is 16-bits wide to serve as both—the OpCode and the preamble (e.g., removing the need for a separate, additional preamble).

Note that historically, the preamble and the interframe gap (IFG) served two different functions. The preamble was used to perform clock recovery at the receiver (hence the exemplary signature, 0xA5A5), while the IFG was time-required to detect collisions on the wire (e.g., with CSMA-CD at 10 Mbps). Since the interfaces considered herein are point-to-point, the IFG is no longer required and is present only to allow triple-speed (e.g., 10/100/1000 Mbps) MACs to fall back to 10 Mbps mode of operation. The preamble, on the other hand, still remains relevant and hence is two (2) bytes.

Figure 4:
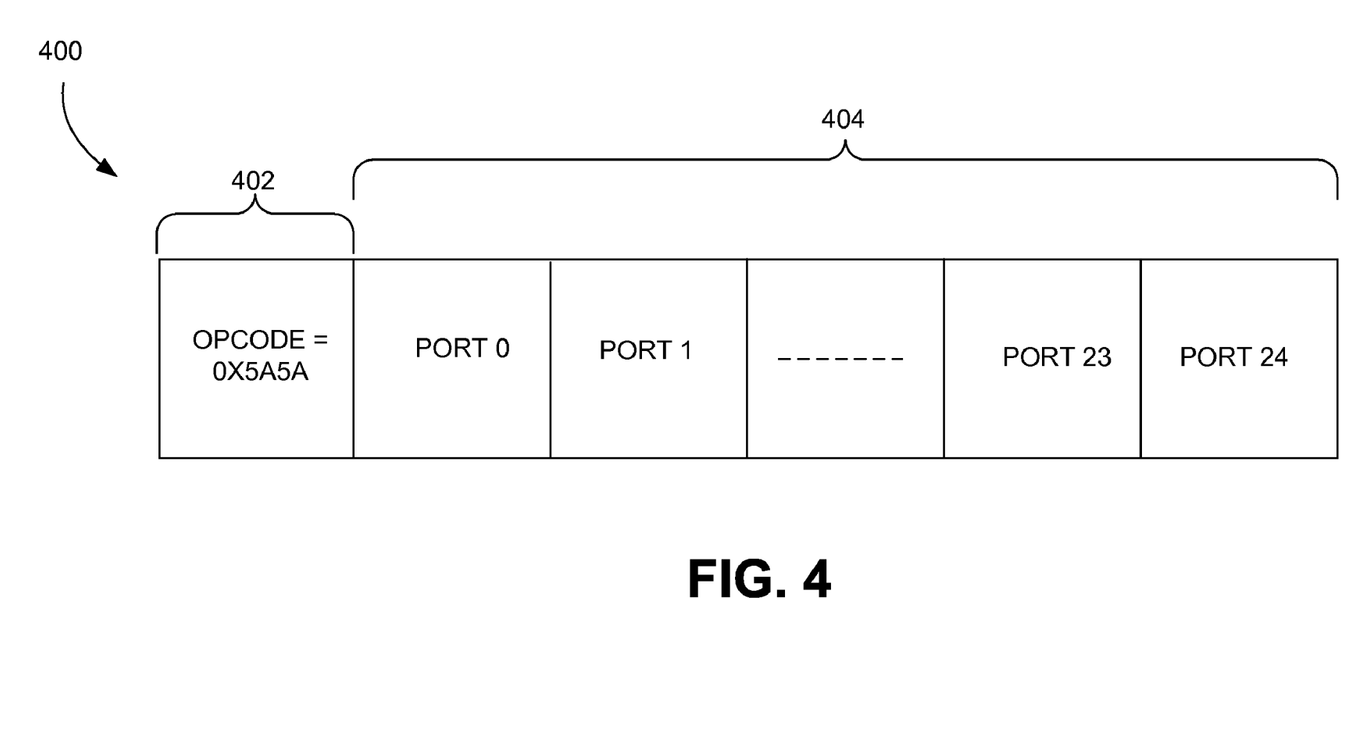
FIG. 4 is a block diagram that illustrates an exemplary status report format for a 24-port embodiment of the interface system shown in FIG. 2.

One exemplary format for the status report 400 (the status response) is shown FIG. 4 for a 24-port implementation. As shown, the status report 400 comprises an OpCode portion 402, and portions 404 corresponding to port information. In one embodiment, the per-port information may be 4-bits, comprising two (2) latencies×two (2) priorities per latency. In some embodiments, the per-port information can be extendable to 8-bits (four (4) latencies×two (2) priorities), or fewer or greater in some embodiments.

Figure 5:
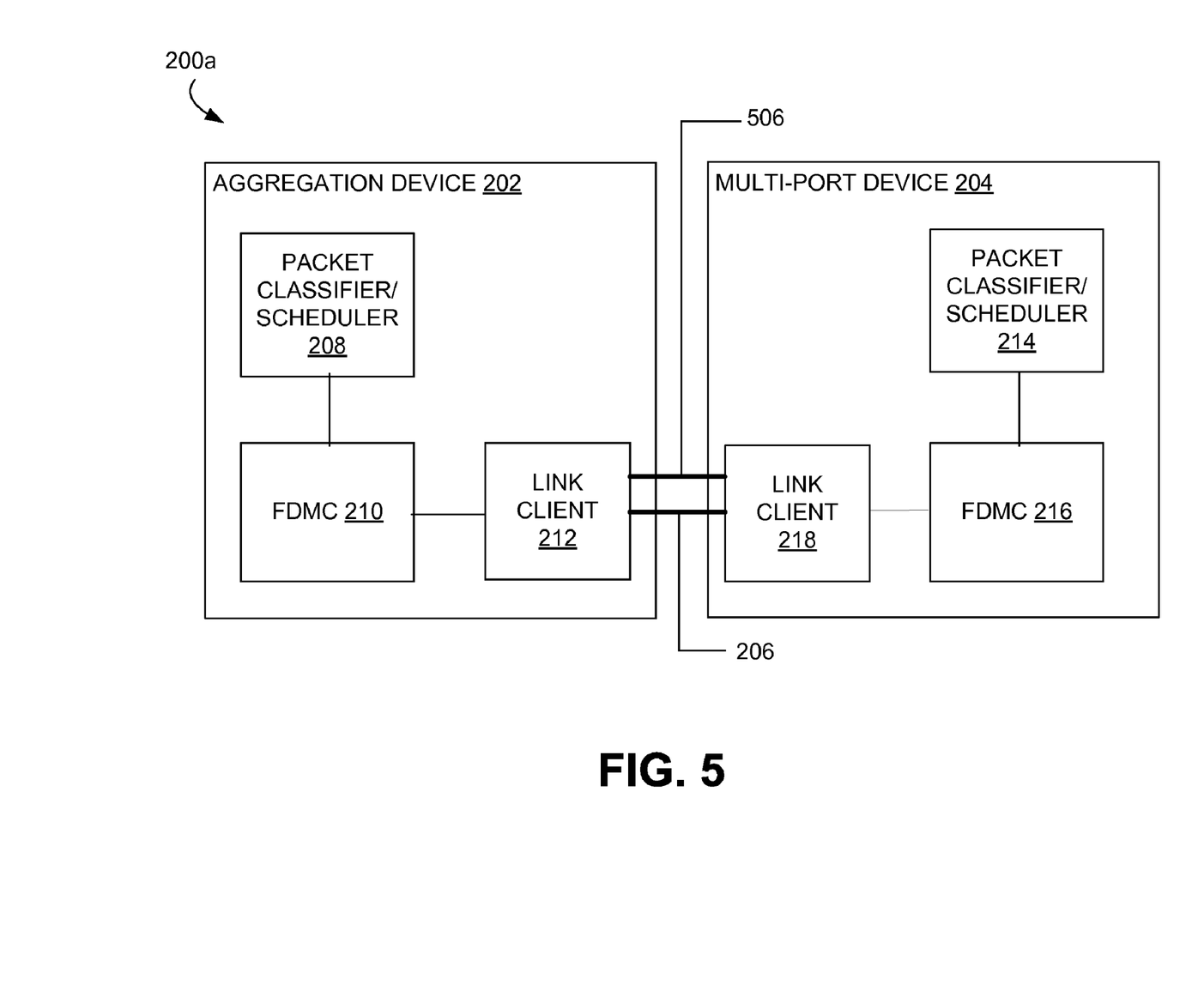
FIG. 5 is a block diagram that illustrates another embodiment of an interface system that uses a separate out-of-band channel to communicate flow-control information.

Having described the information component of flow-control mechanisms of the interface system 200, attention is now directed to the channel component. The mechanisms used to communicate the information (e.g., flow control information) can be broadly classified as in-band and out-of-band. Referring first to the out-of-band mechanism, one embodiment of the interface system 200 employs a separate path between the aggregation device 202 and the multi-port device 204 to communicate flow-control information between the two devices 202, 204, as illustrated in FIG. 5. For instance, in the interface system 200a shown in FIG. 5, a separate, 1-bit serialized interface link 506 can be used to communicate flow-control information (e.g., using two (2) pins). In an Ethernet embodiment, such an interface link 506 can either operate at the same speed as a SGMII link (e.g., 12 GHz), or operate at a lower speed (e.g., 125 MHz, same as SMII). In one embodiment, one such interface link 506 can be used for each link 206 used between the aggregation device 202 and the multi-port device 204.

With regard to in-band mechanisms, certain embodiments of the interface system 200 have several options. In one embodiment, non-data bits and superframes can be sent along the link 206. For instance, additional bytes may be added (in addition to the IFG and preamble) for carrying flow-control information by preceding each data-packet with this flow-control information, and super-frames can be defined to communicate information for all 192-channels (e.g., assuming a GMII-type for a 24 port application) on the link 206.

In some embodiments, the IFG can be replaced with flow-control information, whereby super-frames can be defined to communicate flow control information for all 192-channels on the GMII-type link 206.

In another in-band approach, a pause flow-control mechanism can be overloaded. For instance, a reserved address may be used (e.g., similar to that used for pause-frames), and channel flow information can be encoded into these reserved spaces and exchanged over the link 206. Several options are available within such a scheme, including (1) exchange information pertaining to one channel per extended-pause frame, (2) exchange information pertaining to more than one channel per extended-pause frame, and (3) exchange information pertaining to all channels per extended-pause frame. Note that since the pause message is sent in-line with the data packets (and in one embodiment, is gated by upstream data packets), additional downstream buffering may be required in the multi-port device 204.

To address the potential for enhanced buffering requirements, some embodiments may use a carrier-sense (CRS) signal to indicate a change in the status information to the remote entity (e.g., the multi-port device 204). The CRS signal operates in an out-of-band fashion (where it is not gated by the upstream traffic), and hence poses a smaller buffering requirement in the multi-port device 204.

Certain embodiments may use other, alternative solutions to communicating flow-control information. For instance, in one embodiment, pause frames may be used for communicating status information, except that the destination MAC address of the pause frame used in such embodiments is different than the standards-defined (e.g., 802.1d) destination MAC address. In one embodiment, the pause frames are used in an out-of-band channel, with one pause frame per channel. In some embodiments, an enhanced pause frame may be utilized, whereby additional information may be encompassed in the frame corresponding to a subset of possible channels and or all possible channels.

In some embodiments, an in-band mechanism for communicating the pause may be implemented, similarly using either a pause frame per channel or an enhanced pause frame (e.g., subset of all possible channels or all possible channels). Note that since the pause frame is required by the standard to be a valid frame (e.g., not utilizing reserved bits from the preamble), a minimum of 64-byte length is required in such implementations (with 60-bytes of payload). Note that space may be left in the packet for extending the mechanism if needed. In one exemplary implementation, a minimum latency in reporting a status is the time to transmit a 64-byte packet plus the 20-byte preamble, equating to eighty-four (84)-bytes at 1000 Mbps (or 672 nsec), which is generally considered an insignificant amount of delay.

One benefit of an in-band, pause frame approach is that such a frame can be used to communicate information pertaining to all ports in a single iteration (e.g., 1-byte status information per port×24 ports equates to 24 bytes out of a 60 byte payload). However, in view of the large number of channels and the ever changing flow-control information on all channels, pause frames are to be exchanged whenever any one channel is congested, potentially consuming a larger percentage of upstream bandwidth by the pause frames. Further, buffering requirements in the multi-port device 204 when using pause may be higher (e.g., due to the flow in-band with data).

In some embodiments, proprietary mechanisms may be employed. For instance, proprietary bitmaps can redefine the IFG and preamble bits on a standard Ethernet interface. Two approaches include an associated mechanism and a non-associated mechanism. In an associated mechanism, flow-control information for a given channel is carried in redefined preamble bits of the associated data packets. Such an approach may simplify the implementation, and obviates the need for addressing information for the flow-control frames (and hence less meta-data). However, if there is no upstream traffic, flow-control information cannot be sent to the aggregation device 202.

With regard to the non-associated mechanism, flow-control information may be upstream (e.g., embedded in the preamble for each frame). Accordingly, the total amount of information sent is 24-bytes, in one implementation, and the total space available is equivalent to the IFG (12 bytes) plus a part of the preamble (6 bytes) for a total of eighteen (18) bytes. Further, information is organized into frames (24 bytes each) and is split into subframes (with suitable identification information) and transmitted in the IFG plus preamble of two or more frames. One potential benefit of sending frames of information (as opposed to putting a channel-address in the status frame and sending the status of one channel) is that no addressing information is needed. That is, channel-information is derived from the location of the information within the status frame.

In some embodiments, proprietary bitmaps can be extended to report queue-filled level information (e.g., autonomously or in a query-response fashion).

Figure 6:
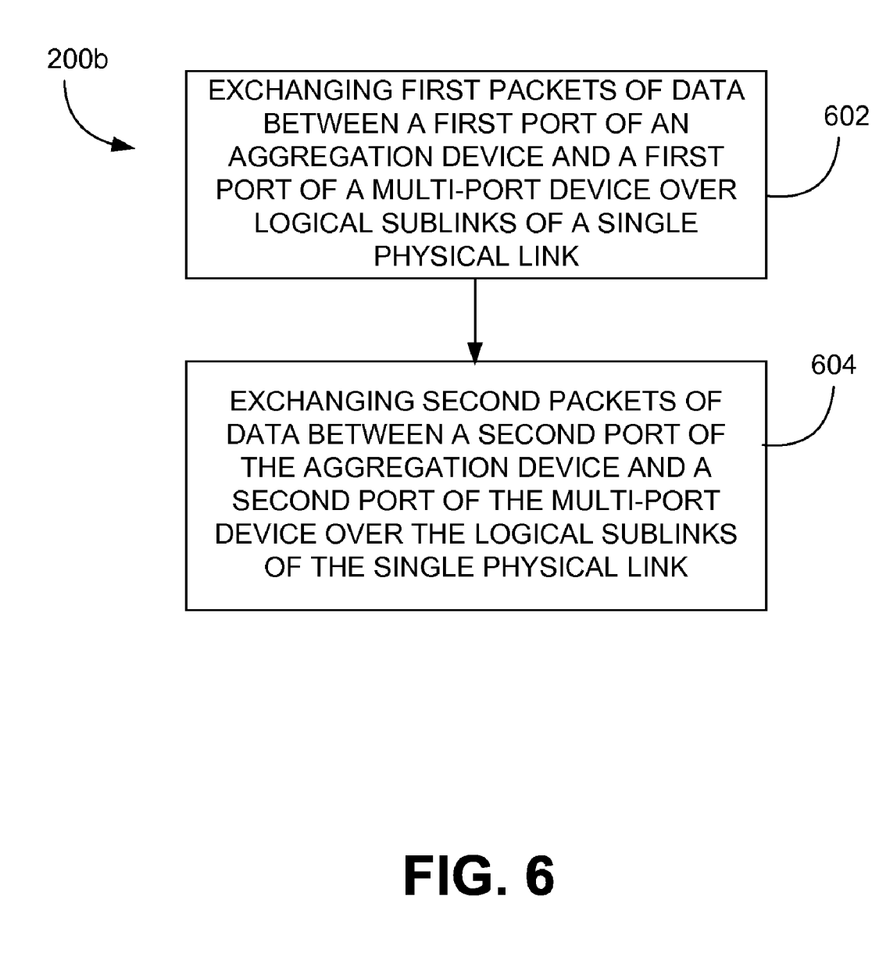
FIG. 6 is a flow diagram that illustrates an interface method embodiment.

Having described various embodiments of interface systems 200, it can be appreciated in view of the present disclosure that one method embodiment 200b, as shown in FIG. 6, comprises, among others, exchanging first packets of data between a first port of an aggregation device and a first port of a multi-port device over logical sublinks of a single physical link (602), and exchanging second packets of data between a second port of the aggregation device and a second port of the multi-port device over the logical sublinks of the single physical link (604).

Any process descriptions or blocks in the flow diagram of FIG. 6 should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, depending on the functionality involved, as would be understood by those reasonably skilled in the art of the present disclosure.

Various embodiments of the interface system 200 (e.g., including system 200a, method 200b) can be implemented in hardware, software, firmware, or a combination thereof. In software or firmware implementations, such software/firmware of the interface system 200 are implemented in software or firmware that is stored in a memory and that is executed by a suitable instruction execution system. In hardware implementations, such hardware of the interface system 200 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Interface system functionality implemented by programming, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of the certain embodiments of the present disclosure includes embodying the functionality of the embodiments of the present disclosure in logic embodied in hardware or software-configured mediums.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the disclosure. All such modifications and variations are intended to be included herein within the scope of this disclosure and protected by the following claims.

The invention claimed is:

1. A system, comprising:
an aggregation device comprising a plurality of ports;
a multi-port device comprising a plurality of ports; and
one or more links that link the entire plurality of ports of the aggregation device and multi-port device, the one or more links fewer in quantity than the entire plurality of ports, and wherein the multi-port device and the aggregation device are configured to exchange information responsive to congestion at the multi-port device, wherein the information is exchanged autonomously, by a polling mechanism, or a combination of both, and wherein the polling mechanism comprises an exchange of an opcode corresponding to a status query and an exchange of a status report comprising port information for the entire plurality of ports.

2. The system of claim 1, wherein the multi-port device further comprises a plurality of xDSL ports in addition to the plurality of ports.

3. The system of claim 1, wherein the one or more links each comprise one or more logical sublinks.

4. The system of claim 1, wherein the one or more links comprises one of a media independent interface (MII) link, a serial media independent interface (SMII) link a gigabit media independent interface (GMII) link, a serial gigabit media independent interface (SGMII) link, a reduced gigabit media independent interface (RGMII) link, and a SerDes link.

5. The system of claim 1, wherein the aggregation device comprises a multiplexing module configured to associate a packet received from an upstream device with a channel of the one or more links.

6. The system of claim 5, wherein the channel comprises logical subdivisions corresponding to one or more parameters.

7. The system of claim 6, wherein the one or more parameters include one or more of a port, a latency with the port, and a priority with the port and latency combination.

8. The system of claim 6, wherein the multiplexing module is configured to uniquely address each of the logical subdivisions.

9. The system of claim 1, wherein the information is exchanged in-band along the one or more links.

10. The system of claim 9, wherein the information exchanged in-band comprises non-data bits and superframes.

11. The system of claim 9, wherein the information exchanged in-band is one of communicated in one of an interframe gap of a preamble and encoded in reserved addresses of a packet.

12. The system of claim 1, wherein the information is exchanged out-of-band separate from the one or more links.

13. The system of claim 1, wherein flow control information is communicated between the aggregation device and the multi-port device using pause frames having a destination address that differs from a standards-based pause frame.

14. The system of claim 1, wherein flow control information is communicated between the aggregation device and the multi-port device according to proprietary mechanisms, wherein the proprietary mechanisms include one of an associated mechanism and a non-associated mechanism.

15. A method, comprising:
exchanging first packets of data between a first port of an aggregation device and a first port of a multi-port device over logical sublinks of a single physical link; and
exchanging second packets of data between a second port of the aggregation device and a second port of the multi-port device over the logical sublinks of the single physical link, wherein exchanging the first and second packets are performed responsive to congestion at the multi-port device, wherein the first and second packets are exchanged autonomously, by a polling mechanism, or a combination of both, and wherein the polling mechanism comprises an exchange of an opcode corresponding to a status query and an exchange of a status report comprising port information for the ports.

16. The method of claim 15, wherein the single physical link comprises one of a media independent interface (MII) link, a serial media independent interface (SMII) link a gigabit media independent interface (GMII) link, a serial gigabit media independent interface (SGMII) link, a reduced gigabit media independent interface (RGMII) link, and a SerDes link.

17. A system, comprising:
means for classifying and scheduling packets;
means for reporting a congestion status on a per-packet basis; and
means for sharing a single channel to send the packets to multiple destinations based on the congestion status, wherein information is exchanged autonomously, by a polling mechanism, or a combination of both, and wherein the polling mechanism comprises an exchange of an opcode corresponding to a status query and an exchange of a status report comprising port information for a plurality of ports.

* * * * *